United States Patent [19]

Nishio et al.

[11] Patent Number: 4,833,820
[45] Date of Patent: May 30, 1989

[54] METHOD OF GROWING MUSHROOMS AND APPARATUS THEREOF

[75] Inventors: Masakazu Nishio, Shiga; Akira Asaka, Osaka, both of Japan

[73] Assignee: Kurimoto Ltd., Osaka, Japan

[21] Appl. No.: 29,559

[22] Filed: Mar. 24, 1987

[51] Int. Cl.⁴ .............................................. A01G 1/04
[52] U.S. Cl. .................................................... 47/1.1
[58] Field of Search ......................................... 47/1.1

[56] References Cited

FOREIGN PATENT DOCUMENTS 2443798 8/1980 France .................................... 47/1.1

OTHER PUBLICATIONS

Hosling, J. J. "Separating Spawn-Run Casing From Compost", *The Mushroom Journal* Apr. 1981, pp. 141, 142.

*Primary Examiner*—James R. Feyrer
*Attorney, Agent, or Firm*—Jones, Tullar & Cooper

[57] ABSTRACT

The invention is to provide an improved method of growing mushrooms and a device for use therein. According to conventional methods, harvest of mushrooms sharply declines in quality and quantity on and after about the fourth time of harvest after starting the first harvest, hence it is necessary to scrap a growing bed once used and to prepare a new growing bed entirely repeating the same arrangement from the initial stage. According to the invention, a fruit body bud gathering layer once formed around the boundary between a compost layer and a casing soil layer is removed immediately before the decline in harvest, thereby improving the mushroom harvest both in quality and quantity. Cost reduction according to one embodiment amounts to 20-28%.

4 Claims, 6 Drawing Sheets

FIG. 2
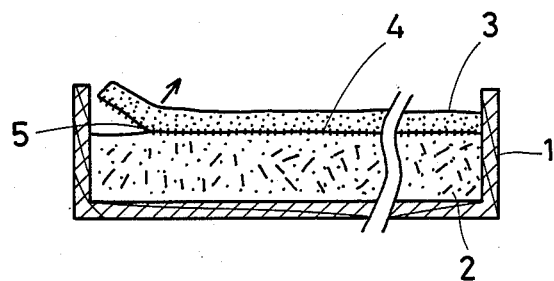
A
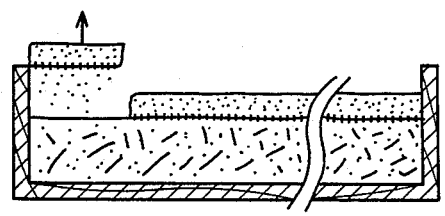
B
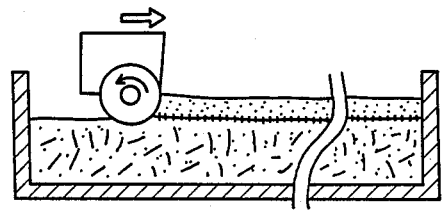
C
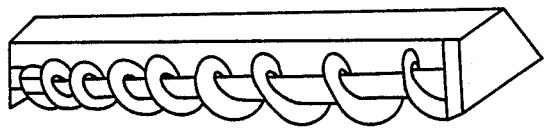
D

FIG. 2
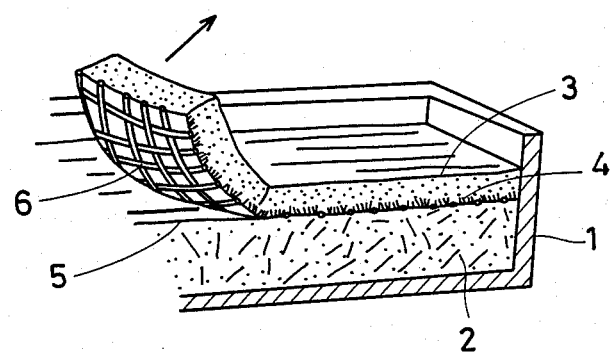
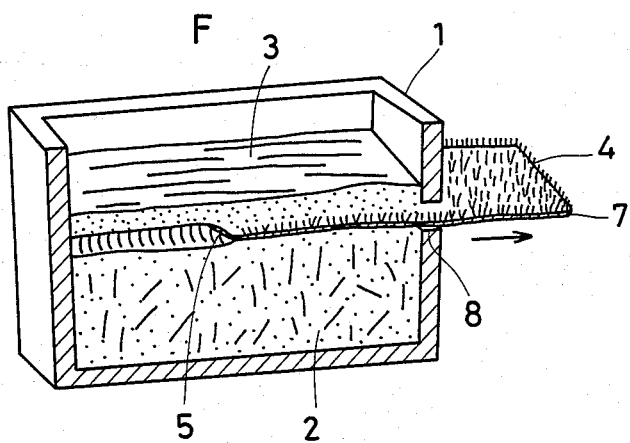

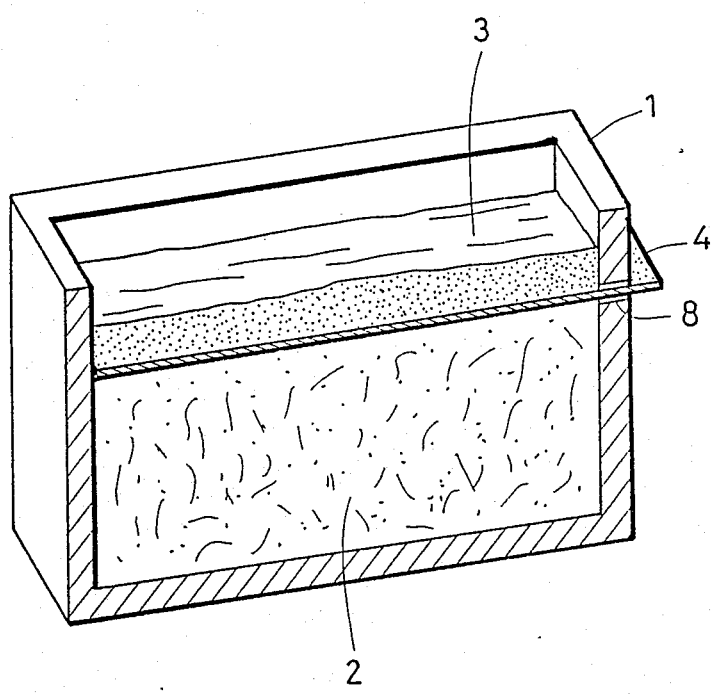
Fig. 2.G

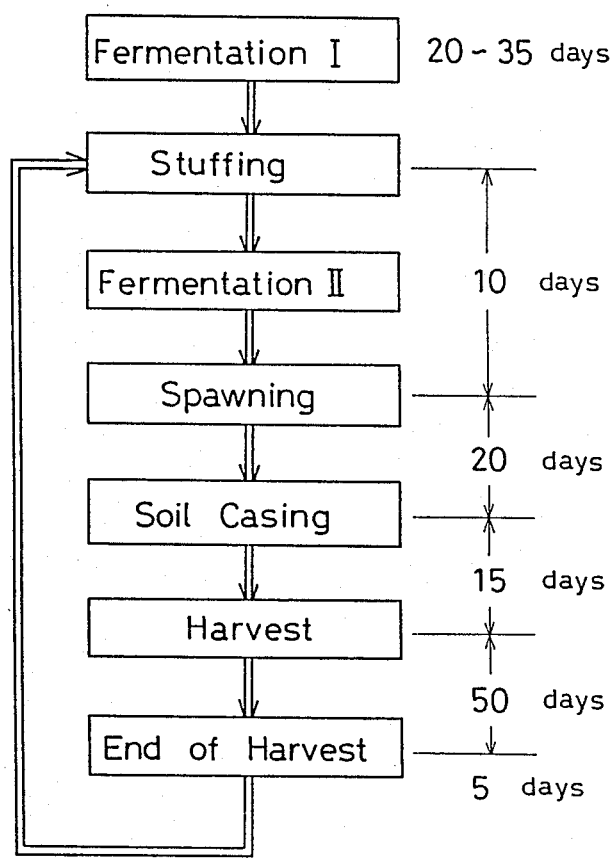

METHOD OF GROWING MUSHROOMS AND APPARATUS THEREOF

BACKGROUND OF THE INVENTION

1. Field of the Invention

The present invention relates to a method of growing mushrooms and an apparatus thereof.

2. Prior Art

FIG. 5 is a flow-sheet showing a mushroom growing process conventionally adopted.

According to the conventional process for growing and harvesting mushrooms on commercial basis, first a compost is prepared by mixing vegetable carbohydrate (hemicellulose, cellulose) such as wheat straw, rice straw or the like with nitrogen source such as horse manure, ammonium sulfate, lime nitrogen, urea, etc. to carry out aerobic fermentation (fermentation I). Growing beds of fixed or stationary type are stuffed with the compost to form a compost layer (stuffing), then second fermentation is performed, and sterilization and compost ageing are further performed (fermentation II).

When the fermentation is almost terminated and the temperature of the compost layer comes down to 22°–25° C., mushroom fungi are spawned in the compost spawning, thus cultivation of mushroom fungi being started. When the cultivation has advanced and the fungi are sufficiently formed in the compost layer, soil of a few centimeters in thickness is applied to the surface of the compost layer to accumulatively form a casing soil layer (casing). By such an arrangement, hyphaes are collectively unified around the boundary between the casing soil layer and the compost layer to germinate a bud or fruit body initiate (i.e., a so-called pinhead) of fruit body (mushroom), which grows to a harvestable fruit body under a well-controlled atmosphere.

According to the conventional mushroom growing process operated on a commercial basis, harvest time continues 7 to 10 days and is periodically repeated. In general, this most fruitful harvest time is repeated 3 times or so with sufficient yield both in quantity and quality, but after the harvest time the yield sharply declines in quantity and quality (harvest).

Since the yield of mushrooms sharply declines on and after the fourth harvest time both in quantity and quality, in order to improve the harvest efficiency or productivity, it is usually adopted by growers that the harvest days are restricted to 40 to 60 days, thereafter the growing beds used up to that time are abandoned or scrapped (end of harvest) and the content therein is removed for replacement, and after performing sterilization the beds are stuffed with new compost to start again the steps shown in FIG. 5.

As a result, a satisfactory high level of harvest cannot be expected since the contents of the beds are abandoned and scrapped in so short a time, i.e., only after the operation of 40 to 60 days, which makes the growing operation less productive, busy and hard all year. Moreover, there is a problem of economy due to accumulation of material cost under such low level of productivity.

SUMMARY OF THE INVENTION

The present invention was made to solve the above-discussed problems and has an object of providing a novel method of growing mushroom and an apparatus exclusively used for this purpose in which the number of times of scrapping a bed and stuffing thereof are decreased through the year, and almost constant and high level harvest can be attained.

In order to accomplish the foregoing object, the method of growing mushrooms according to the present invention comprises the step of removing only a fruit body bud forming or gathering layer formed at the interface between the covering soil layer and the compost layer.

The apparatus according to the invention used exclusively for embodiment of the foregoing method comprises a porous plate member interposed between the casing soil layer and the compost layer, the member being used for removal of the fruit body bud gathering layer. The porous plate member is preferably formed into a web-like structure of metallic wires or plastic. The member is also preferably formed into a planar component of non-metallic fibers. It is further required for the cultivating box to be constructed in such a manner that only the bud forming or primordia initiate layer may be drawn out and removed.

The function performed by the present invention with the following characteristics and with the lapse of time for mushroom growing is described hereinafter.

According to the prior method, the harvest declines sharply both in quality and quantity and in order to eliminate the cause of the decline, various case studies have been conducted and it was found that a primary cause of the decline exists in the formation of the fruit body bud (hereinafter referred to as "pinhead") gathering layer. As mentioned above, mushroom fungi grow into the casing soil, then the mushroom hyphaes are gathered to form a pinhead due to a lowering in temperature and change in carbon dioxide gas density, and this pinhead grows to a mushroom. A problem exists in that the pinhead is initiated at the interface between the compost layer and the casing soil layer, and the more the harvest increases due to concentrated initiation, the more the pinhead forming layer is enlarged to the extent of forming a thick plate-like gathering layer.

Since this pinhead gathering layer is a hard and highly dense plate-like layer, fluid communication between the compost layer and the casing soil layer is inhibited, and the aeration and water channelling therebetween are also cutout, which is an obstacle against the growth from the mushroom fungi through the state of a pinhead to a mushroom, needless to say. Further, in spite of water sprinkling, the water cannot sufficiently penetrate into the compost layer but remains excessively in the covering soil layer, thereby negatively affecting the growth of the fungi. Moreover, residual in the pinhead gathering layer may often cause damages by blight and nonoxious insects like fungus, tick, etc., which further deteriorates the growing conditions by contamination.

The formation of pinhead is an essential requirement for harvest of mushrooms, and every grower makes his best efforts in the desirable formation of pinhead. Accordingly, the prior practioners assumed that the idea of removing the pinhead forming layer means an abandonment of mushroom growing and is out of the question or absurd.

The inventor, however, have given attention to the fact that the pinhead forming layer is indeed indispensable to the mushroom growing, but it becomes an obstructive factor with the lapse of time, and found that the harvest can be greatly improved both in quality and quantity by re-establishment or rearrangement of mushroom growing conditions by removing the pinhead forming layer. In other words, the inventors found that when removing the pinhead forming layer after the periodical 3rd or 4th harvest of mushrooms and repeating the known control of the casing soil layer thereafter, the next separation of the pinhead forming layer becomes possible so long as sufficient fertility of the soil is maintained. In this case, it is preferable that the compost stuffing is carried out so as to make it thicker (no less than 25 cm) than the preceding one to achieve better results in the cultivation.

As a result of the foregoing arrangement and function performed in the method and apparatus according to the invention, an abundant harvest by far is insured both in quality and quantity as compared with the prior art just by removing obstructive factors due to the existence of the pinhead forming layer before entering the declining step.

Although the harvest of mushrooms depends on natural conditions and artificial control conditions, it is certain that an improved result can be enjoyed by the present invention, which will become apparent in the course of the following description with the accompanying drawings. Besides, such secondary advantages as cost saving in labor cost, material cost is insured in addition to the foregoing advantage.

BRIEF DESCRIPTION OF THE DRAWINGS

FIG. 2A to G are partial sectional views;

FIG. 5 is a flow-sheet of the prior art.

BRIEF OF THE PREFERRED EMBODIMENT

Figure 1:
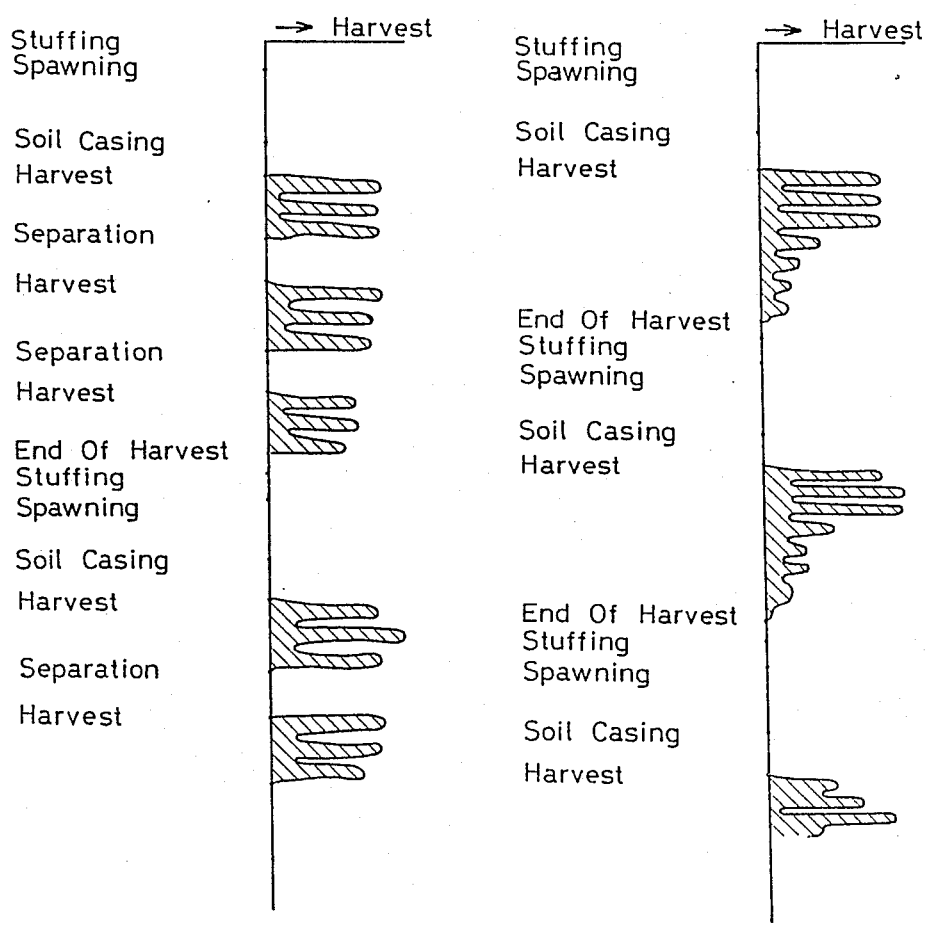
FIG. 1A (method by the invention) and B (prior method) are explanatory function views showing a relation between respective operating steps and harvest amounts.

FIGS. 1A, B typically show a characteristic of the function exhibited by the present invention and the prior art, wherein A shows the invention while B the prior art. The ordinate axis shows a harvest per day and the abscissa shows steps in sequential order with the lapse of time. The total harvest can be calculated by integrating the hatched area. As seen from the drawings, in place of losing the harvest expected in the decline period, the waiting time up to the next most fruitful period is considerably shortened and as a whole the total active period of young pinhead forming layers becomes large, and therefore an increase of the total harvest can be expected.

The foregoing effect can be ascertained in detail by the following embodiment.

When removing the pinhead forming layer, various embodiments can be applied. FIGS. 2F and G, respectively show an embodiment.

Referring to these drawings, a compost layer 2 is aged in a growing bed 1 and cased with soil layer 3.

With the progress of the growing a primordia initiate pinhead forming layer 4 is formed around the boundary 5 between the compost layer and the casing soil layer.

After a certain period of time, the pinhead forming layer 4 is exhausted and forms a plate-like obstructive wall which necessarily must be removed.

In FIGS. 2F and G, the boundary portion is formed into a thick plate member of non-metallic fiber. It is preferable to use a non-woven matt-like cloth formed of short-cut chips of glass fiber or plastic fiber by compression molding. It is also satisfiable to use a thick woven matt-like cloth.

In this embodiment using the matt-like cloth, a horizontal slit 8 is preliminarily formed on one side of the growing bed to be interposed between the compost layer and the casing soil layer in the initiate stage of growing bed arrangement with one end of the cloth extended out of the slit 8 as shown in FIG. 2G. In the separation step, only the matt 7 and the pinhead forming layer gathered thereon can be separated and removed by pulling the end through and out of the slit 8 as shown in FIG. 2F. In this embodiment, after the steps of addition of casing soil, levelling of surface thereof and readjustment of PH, the control under the same conditions as the initial stage is repeated.

Figure 3:
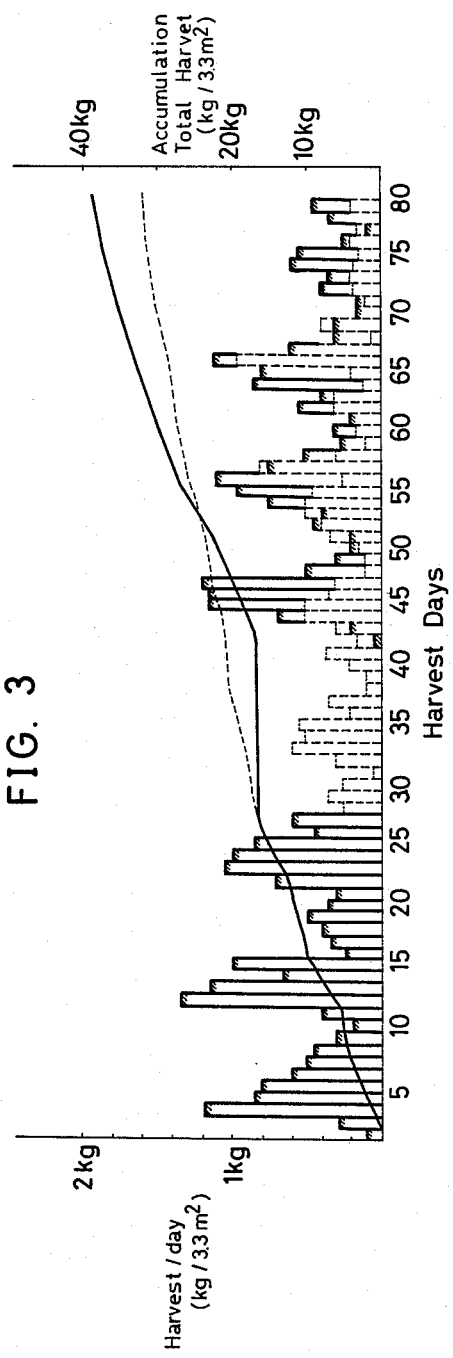
FIG. 3 shows a relation between a harvest per day and the number of days in an embodiment according to the invention by a solid line, and the same relation in a control started on the same initial condition by a broken line.
Figure 4:
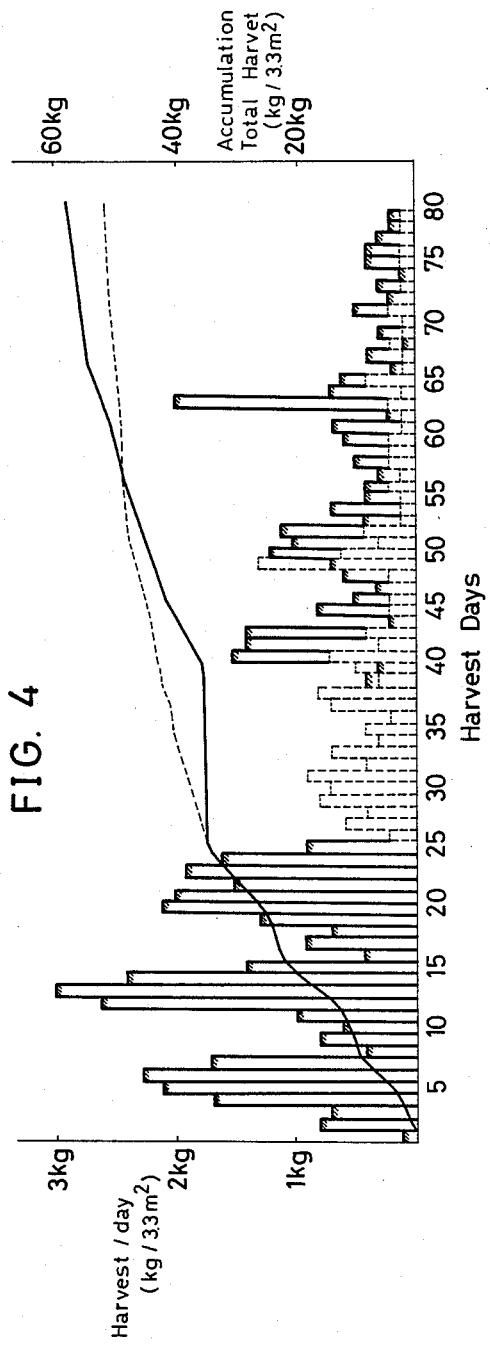
FIG. 4 shows the same relation as FIG. 3 in another embodiment by solid line and broken line respectively.

FIGS. 3 and 4 show effects of the foregoing embodiment according to the invention, and wherein a solid line in FIG. 3 shows an example of harvest (a broken line shows a prior art as a control in which growing was started with the same initial conditions), while a solid line in FIG. 4 shows another example of higher harvest (a broken line shows a control on the same condition). In both drawings, the variation of harvest is shown day by day with the lapse of time after starting the harvest.

In effect, the total harvest was increased by 21% in the case of FIG. 3 (bad harvest) and by 13% in the case of FIG. 4 (abundant harvest).

It is to be noted that not only an improvement in the quality and quantity of the harvest is attained, but a great saving in labor for the growing bed arrangement and the cost of materials are attained. Considering such secondary advantages, the improvement in the earning rate amounts to 20–28% as a whole.

We claim:

1. An improved method of growing mushrooms comprising the steps of:
    providing a layer of compost in a growing bed;
    inoculating said compost with a mushroom fungi, and allowing the spawn to run;
    casing said compost with a layer of soil whereby mushroom fruit body primordia are initiated in a layer at the interface between the soil casing and compost layers;
    repeatedly harvesting mushrooms which grow through the casing layer in flushes until production declines, the improvement comprising: after production has declined, removing only the layer of fruit body primordia initiation at the interface between the casing layer and the compost layer whereby production at the highest level will be substantially resumed.

2. An improved assembly for growing mushrooms comprising:
    a cultivating box having an open top and at least one end for defining a growing bed;
    a layer of compost contained within said cultivating box;
    a mushroom spawn colonizing said compost layer; and,
    a layer of casing soil overlying the layer of compost, whereby a mushroom fruit body primordia layer develops at the interface between the compost layer and the casing layer and from which mushroom fruit bodies grow upwardly, through said casing layer for harvest in a series of flushes which decline after several flushes, the improvement comprising:

a porous plate member interposed between the compost layer and the layer of casing soil;

a slit defined in said at least one end of said cultivating box, one end of said plate member extending out of said slit so as to be grasped for removal of said plate member and thereby removing said mushroom fruit body primordia layer, whereby production at the highest level will be substantially resumed.

3. The improved assembly as defined in claim 2, wherein said porous plate member is a net-like structure formed of deterioration resistant material.

4. The improved assembly as defined in claim 2, wherein said porous plate comprises non-metallic fibers.

* * * * *